United States Patent Office 2,871,505
Patented Feb. 3, 1959

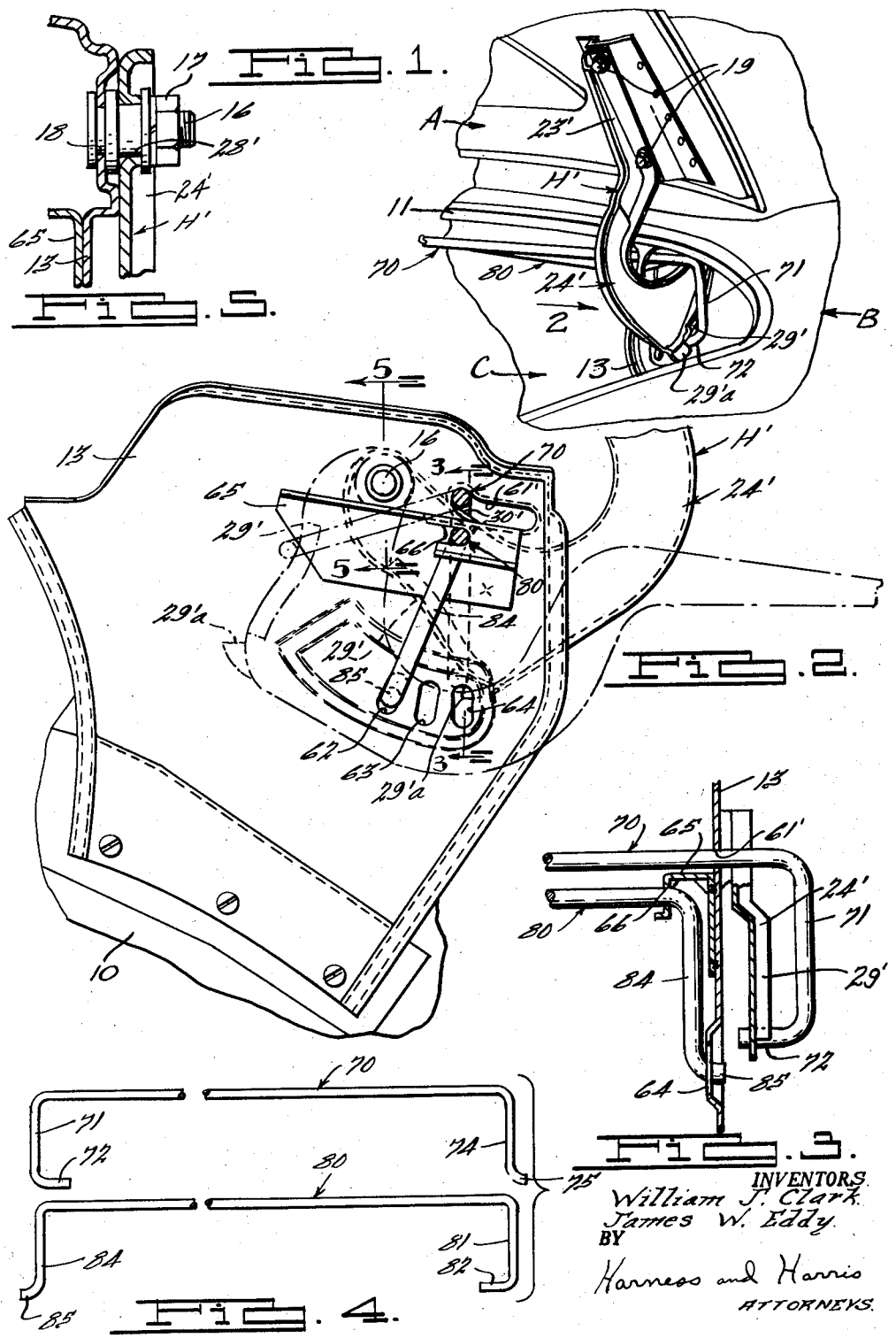

2,871,505

TORSION BAR HINGE ASSEMBLY

William J. Clark, Royal Oak, and James W. Eddy, St. Clair Shores, Mich., assignors to Chrysler Corporation, Highland Park, Mich., a corporation of Delaware Application March 31, 1954, Serial No. 420,006

8 Claims. (Cl. 16—180)

This invention relates to hinge constructions and refers more particularly to improvements in hinges of the type commonly employed for supporting trunk lids or engine compartment hoods on motor vehicle bodies.

Considerable difficulty has heretofore been encountered in developing a completely satisfactory hinge for use in mounting trunk lids or engine hoods on motor vehicle bodies and one of the most serious problems involved has been to provide a hinge of such a compact construction that it will not appreciably obstruct the storage space provided within the compartment and still include suitable counterbalance means.

It is one of the principal objects of this invention to overcome the foregoing difficulties by providing a compact hinge construction which occupies the minimum space within the storage compartment and at the same time embodies means for effectively raising and holding the pivotally mounted closure member for the compartment in open positions.

Another advantageous feature of this invention resides in the provision of a compact hinge construction of the character set forth wherein the means for holding the compartment closure member in its opened position also assists in the movement of the closure member to its open position.

It is a further object of this invention to provide a closure member hinge construction incorporating a torsion bar spring element for counterbalancing the closure member, the torsion bar spring element being connected to the hinge element and its support in a novel manner.

In addition to the foregoing, the present invention contemplates a compact hinge construction embodying the foregoing features and composed of a relatively few simple parts each of which is capable of being economically manufactured, assembled and installed in a closure member construction of the type described.

The foregoing, as well as other objects and advantages of this invention, will be more readily apparent as the following description thereof proceeds, especially when considered in connection with the accompanying drawings wherein:

Fig. 1 is a perspective view looking across the rear end of a vehicle body trunk compartment wherein the compartment cover or lid is hingedly connected to the body by a hinge assembly embodying a preferred form of this invention;

Fig. 2 is a side elevational view of the form of the invention shown in Fig. 1, this view being taken looking in the direction of the arrow 2 of Fig. 1;

Fig. 3 is a fragmentary sectional elevational view taken along the line 3—3 of Fig. 2;

Fig. 4 is a plan elevation of the pair of torsion bar springs used in the form of the invention shown in Figs. 1-3; and Fig. 5 is an enlarged, fragmentary, sectional elevational view taken along the line 5—5 of Fig. 2.

In the embodiment of the invention disclosed in Figs. 1-5 of the drawings the torsion bar spring hinge elements 70, 80 are shown applied to one of a pair of spaced apart hinge structures H' (only one shown) associated with the rear deck closure member or trunk lid A of the automobile body B. Lid A is hingedly connected to the body B by a pair of the hinge structures H' so that the lid A forms a pivotally mounted closure member for the opening to the body compartment C. Located in the upper forward portion of the compartment C, so as to extend vertically between each of the body rear wheel housings 10 and the top wall 11 of the compartment C, is a relatively fixed, bracket type, body tie plate or frame member 13. The bracket type body plate 13 has a pintle bore 18 therethrough that is adapted to provide a mount for the hinge pintle bolt of the hinge assembly H'. Pintle 16 is removably connected to the hinge H' and the support plate 13 by nut 17 (see Fig. 5). Support plate 13 with the hinge structure H' mounted thereon is identical on each side of the compartment C therefore a description of only one hinge structure H' and associated plate 13 is given.

Each goose-neck hinge H' is formed from a T-section strap portion 23' that is connected to the lid A and a connected, U-shaped neck portion 24' that is pivotally connected to the associated support plate 13. The free end of each hinge neck portion 24' (see Figs. 2 and 5) is formed with a hinge pintle bore 28' that is adapted to be aligned with a hinge pintle bore 18 in its associated support plate 13. The strap portion 23' of the hinge H' is connectible to the closure lid A by the bolts 19.

In the preferred form of the invention shown the pair of torsion bars 70, 80 extend between the support plates 13 that are mounted on the transversely spaced apart wheel housings 10. Each of the torsion bars 70, 80 has its anchor end 74 or 84 anchored to one of the support plates 13 by means of its anchor stud 75 or 85 seating in one of the slots 62, 63 or 64 formed in the support plates 13. Brackets 65 on each of the plates 13 have slots 66 that receive and support the anchor end of each torsion bar 70, 80. The actuator ends 71, 81 of each of the torsion bars 70, 80 respectively extend through the slots 61' in the support plates 13 so that the torsion bars are each supported at each end by means of slot-like formations on the spaced apart support plates 13.

The goose-neck type strap hinges H' used in this form of the invention each comprise a leg portion 23', that is connected to the closure lid A by suitable connector means 19, and an integrally formed, substantially U-shaped, neck portion 24'. Neck portion 24' has a hinge pintle bore 28' therethrough that receives a pintle pin 16. The pintle pin also extends through an aligned pintle bore 18 in the support plate 13 and thus pivotally connects the associated hinge H' to the support plate 13. The outer rear edge 29' of each hinge neck portion 24' is formed with a flange portion preferably so as to provide a flat cam surface along which the bent end or stud portion 72 of torsion rod actuating lever 71, or stud portion 82 of torsion rod actuating lever 81, will ride during hinging action. The rod ends 72, 82 and the hinge edge surfaces 29' thus provide cam and follower connector means between the torsion rods 70, 80 and the hinges H' to control movement of the closure lid A. It is thought to be obvious that various desired closure opening actions can be obtained with a hinge of this type depending on the specific formation of the cam surfaces 29'. At the lower end of the cam surfaces 29' is a shoulder formation 29'a that provides a limiting means to engage the torsion rod stud ends 72, 82 when the closure lid A has been moved to an uppermost position. However, prior to engagement of the rod stud ends 72, 82 with the shoulder formations 29'a the inner edge 30' of the hinge neck portions 24' will engage the flexible torsion rods 70, 80 (see Fig. 2) and limit opening movement of the closure A. The several slots 62—64 provide means for readily adjusting the pre-stress to be set up in the torsion rods 70, 80 during hinge installation.

In the disclosed form of the invention the actuating lever arms 71 and 81 of the two similar torsion bars 70, 80 (see Fig. 4) respectively, have offset studs 72 and 82 respectively that provide follower means due to their engagement with the cam surfaces 29' formed along the rear edges of the goose-neck portions 24' of the hinge elements H'. Thus it will be seen that the movement of the hinges H' is transmitted directly to the actuating lever arms 71, 81 of the torsion bars 70, 80. In this simplified design the action of the closure lid A through its rotation cycle is the product of the two low rate torsion bar springs 70, 80 and the cams 29' on the hinge necks 24'. The cam faces or surfaces 29' are generated so as to give the desired type of lid opening and closing action. Another feature of this invention (see Fig. 2) is that due to the particular hinge shape and the relative location of the torsion bars 70, 80, the hinges H' are stopped at their open positions by the hinge portions 30' coming in contact with the adjacent portions of the torsion bars. This stop arrangement cushions the lid against the flexible torsion rods.

Because of the cam design 29' controlling the torsion bar stress build up with this form of the invention, it is possible to develop a unique feature in this mechanism which is quite desirable. If the lid A is locked in closed position then a pop-up or pop-open action is achieved when the lid A is first unlocked from the surrounding body structure B. The lid will merely pop open a few degrees and then dwell in this opened position. Thereafter on application of a very slight manual assist the lid A will then carry through to the open position with adequate force to maintain its full open position. A wide range of lid opening and closing action can be readily obtained by changing the shape of the hinge cam surface 29'. Hinge shoulders 29'a cooperate with rod ends 72, 82 to provide a spring cushioning device for limiting closure opening movement. It will be noted that the cam portions 29'a on hinge cams 29' provide stop or shoulder means engageable with the torsion rod stud portions 72, 82 for limiting opening movement of the closure lid A. These cam shoulders 29'a thus prevent the disengagement of the torsion rod ends 72, 82 from the hinge cam surfaces 29'. The shoulders 29'a also assist in limiting opening movement of the lid A for they engage the rod ends 72, 82 at the same time that the hinge portions 30' (see Fig. 2) clamp against the tie plate mounted rod portion adjacent the slots 61'.

From the above description it is thought to be rather obvious that this invention provides a torsion bar type of hinge structure that is formed from a relatively few, simple, inexpensive parts that may be quickly and economically manufactured and assembled. The hinge structure occupies relatively little compartment space and is located in a portion of the compartment that has practically no use as a storage space. In addition it will be noted that the preferred form of the invention shown in Figs. 1–5 includes a cam construction on the neck portion of the hinge elements that may be readily varied to produce the desired type of opening and closing action. Another advantage of this torsion bar hinge structure is that similar parts of the hinges H are identical and interchangeable.

We claim:

1. A hinge construction for a pivotally mounted closure member comprising a pair of spaced, fixed supports having aligned hinge pintle bores therein, a pair of hinge members mounted on said closure member each having hinge pintle bores therein aligned with and pivotally connected to the hinge pintle bores in said spaced supports, said hinge members each having a cam formation radially offset from its hinge pintle bore, rod receiving formations on each of said fixed supports to supportingly receive a pair of rod-like torsion spring elements, a pair of rod-like torsion spring elements mounted on and extending between said rod receiving formations, said spring elements each having a pair of spaced crank portions, one crank portion of each spring element being mounted on each of said fixed supports so as to resist rotation of the rod-like torsion springs about their longitudinal axes and the other crank portion of each spring element being connected to the cam formation on the hinge member connected to the other fixed support whereby rotation of the hinge members about their pivot axes twists the rod-like torsion springs and varies the torsional stress in the torsion spring elements.

2. A hinge construction for a pivotally mounted closure member comprising a pair of spaced apart fixed support plates each having aligned hinge pivot portions, a pair of hinge members mounted on said closure member in spaced apart relationship and having hinge portions pivotally connected to the hinge portions of said support plates, said hinge members each having a cam formation radially offset from its pivotal axis, rod receiving formations on each of said support plates, a pair of torsion rods mounted on and extending between the rod receiving formations on said spaced apart support plates, each torsion rod having a portion adjacent one end thereof fixedly anchored to one of said support plates and a crank arm adjacent the other end slidably engageable with the cam formation carried by the hinge member pivotally mounted on the other support plate, the engagement of the crank arms with the hinge member cam formations during pivotal movement of the closure member varying the torsional stress in the torsion rods.

3. A hinge construction for a pivotally mounted closure member comprising a pair of spaced apart fixed support plates each having aligned hinge pivot portions, a pair of hinge members mounted on said closure member in spaced apart relationship and having hinge portions pivotally connected to the hinge portions of said support plates, said hinge members each having a cam formation radially offset from its pivotal axis, rod receiving formations on each of said support plates radially offset from the hinge pivot portions thereof, a pair of torsion rods mounted on and extending between the rod receiving formations on said spaced apart support plates, each torsion rod having a portion adjacent one end thereof twisted from its normal position to pre-stress the torsion rod and fixedly anchored to one of said support plates and a crank arm adjacent the other end slidably engageable with the cam formation carried by the hinge member pivotally mounted on the other support plate, the engagement of the crank arms with the hinge member cam formations during pivotal movement of the closure member varying the torsional stress in the torsion rods, and means on said support plates to adjust the anchored portions of the torsion rods to vary the pre-stress in said torsion rods.

4. A hinge construction for a pivotally mounted closure member comprising a pair of spaced apart fixed support plates each having aligned hinge pivot portions, a pair of hinge members mounted on said closure member in spaced apart relationship and having hinge portions pivotally connected to the hinge portions of said support plates, said hinge members each having a cam formation radially offset from its pivotal axis, rod receiving formations on each of said support plates radially offset from the hinge pivot portions thereof, a pair of torsion rods mounted on and extending between the rod receiving formations on said spaced apart support plates, each torsion rod having a portion adjacent one end thereof fixedly anchored to one of said support plates and a crank arm adjacent the other end slidably engageable with the cam formation carried by the hinge member pivotally mounted on the other support plate, the engagement of the crank arms with the hinge member cam formations during pivotal movement of the closure member varying the torsional stress in the torsion rods, said cam formations including shoulder portions engageable with the crank arm portions of said torsion rods to limit the hinging movement of the closure member.

5. A hinge construction for a pivotally mounted closure member comprising a pair of spaced apart fixed support plates each having aligned hinge pivot portions, a pair of hinge members mounted on said closure member in spaced apart relationship and having hinge portions pivotally connected to the hinge portions of said support plates, said hinge members each having a cam formation radially offset from its pivotal axis, rod receiving formations on each of said support plates, a pair of torsion rods mounted on and extending between the rod receiving formations on said spaced apart support plates, each torsion rod having a portion adjacent one end thereof fixedly anchored to one of said support plates and a crank arm adjacent the other end slidably engageable with the cam formation carried by the hinge member pivotally mounted on the other support plate, the engagement of the crank arms with the hinge member cam formations during pivotal movement of the closure member varying the torsional stress in the torsion rods, said hinge members having portions engageable with the torsion rods at one position of the pivotally mounted hinge members to limit hinging movement of the hinge members in a particular direction.

6. A hinge structure for pivotally mounting a closure member on a relatively fixed support comprising a strap hinge having a leg portion connected to the closure member and a neck portion pivotally connected to a support plate mounted on said fixed support, a rod receiving formation on said support plate, an elongated torsion rod mounted in said support plate rod receiving formation so as to extend in the direction of the hinge pivot axis, means mounting a portion of the torsion rod remote from the support plate on said fixed support to prevent rotation thereof, and a crank arm on said torsion rod having a portion slidably engageable with the hinge neck portion, the portion of the hinge neck portion engaged by the torsion rod crank arm portion comprising a cam surface adapted to effect variation in the torsional stress in said rod during hinge rotation.

7. A hinge structure for pivotally mounting a closure member on a fixed support comprising a strap hinge having a leg portion connected to the closure member and a neck portion pivotally connected to a support plate mounted on said fixed support, a rod receiving formation on said support plate, an elongated torsion rod mounted in said support plate rod receiving formation so as to extend in the direction of the hinge pivot axis, anchor means providing for twisting of portions of the torsion rod from its normal position to pre-stress the rod and for fixedly mounting a portion of the torsion rod remote from the support plate on said fixed support to prevent rotation of that portion of the torsion rod, and a crank arm on said torsion rod having a portion slidably engageable with the hinge neck portion, the portion of the hinge neck portion engaged by the torsion rod crank arm portion comprising a cam surface adapted to effect variation in the torsional stress in said rod during hinge rotation, and means on said fixed support to adjust the anchor mounting of the fixed portion of the torsion rod to vary the torsional pre-stress originally set up in said torsion rod.

8. A hinge structure for pivotally mounting a closure member on a fixed support comprising a pair of hinge members fixed to said closure member and each having a portion thereof pivotally connected to the fixed support for hinging movement about a common pivot axis, a pair of torsion bar hinge springs extending in the direction of the common pivot hinging axis of said hinge members, one end portion of each of said torsion bars being anchored to said fixed support and a crank arm on the other end of each bar, and cam and follower means connecting each crank arm and a portion of one of said hinge members at a point radially offset from the pivot axis of the associated hinge member whereby hinging movement of said hinge members will twist said torsion bar hinge springs about their longitudinally extending axes and vary the stress therein.

References Cited in the file of this patent

UNITED STATES PATENTS

| | | |
|---|---|---|
| 2,602,957 | Anderson | July 15, 1952 |
| 2,688,764 | Squire | Sept. 14, 1954 |
| 2,707,799 | Butterfield | May 10, 1955 |

FOREIGN PATENTS

| | | |
|---|---|---|
| 696,420 | Great Britain | Sept. 2, 1953 |